United States Patent [19]

Melkonian et al.

[11] 3,941,574

[45] Mar. 2, 1976

[54] METHOD OF PREPARING A GLASS BATCH FOR MELTING SILICATE GLASS

[76] Inventors: Garegin Sarkisovich Melkonian, ulitsa Barekamutiana, 26, kv. 11; Laura Atomovna Meliksetian, ulitsa Nalbandiana, 41/1, kv. 2, both of Erevan, U.S.S.R.

[22] Filed: May 21, 1973

[21] Appl. No.: 362,076

[52] U.S. Cl. .................... 65/27; 65/134; 65/136; 106/52; 106/DIG. 8
[51] Int. Cl.$^2$............................................ C03C 1/00
[58] Field of Search ............ 106/DIG. 8, 52; 65/18, 65/27, 134, 136

[56] References Cited
UNITED STATES PATENTS

| | | | |
|---|---|---|---|
| 3,001,881 | 9/1961 | Slayter et al. | 106/DIG. 8 |
| 3,630,673 | 12/1971 | Mod et al. | 106/DIG. 8 |
| 3,682,666 | 8/1972 | Laeourrege | 65/134 X |

OTHER PUBLICATIONS

Advances in Glass Technology, Plenum Press, New York 1962, p. 382.

*Primary Examiner*—Robert L. Lindsay, Jr.
*Attorney, Agent, or Firm*—Haseltine, Lake & Waters

[57] ABSTRACT

In preparing a glass batch for silicate glass melting, a high-modulus calcium-magnesium hydrosilicate is used as intensifier.

3 Claims, No Drawings

METHOD OF PREPARING A GLASS BATCH FOR MELTING SILICATE GLASS

The present invention relates to a method of preparing a glass batch for melting silicate glass.

The widely known method of preparing a glass batch for silicate glass comprises dry mixing of the batch-forming ingredients with the use of fluxes accelerating the glass melting process. Such fluxes are fluorides, boric anhydride, arsenous anhydride $As_2O_3$, nitrates ($KNO_3$ or $NaNO_3$), etc. (cf. the book ("Technology of Glass," by I. I. Kitaigorodsky, 1967, p.101). The method of preparing a glass batch with the use of the fluxes, described in this book, does not meet the requirements of glass melting as some of them (fluorides) destroy the refractory lining of glass furnaces. In addition almost all of the fluxes used volatilize to an extent of 30 to 40 % in the process of glass melting which leads to a rise in glassware production cost; the toxicity of fluorides adversely affects labor conditions and therefore they find a limited application, which ranges from 0.5 to 2 %.

The melting of high-silica ($SiO_2$— above 51 %) and low-alkali glass compounds ($R_2O$ — up to 2 %) based on rocks (basalt, quartz sand, dolomite) with the use of conventional fluxes is not always possible.

It is an object of the present invention to eliminate the aforementioned disadvantages.

A further and more specific object of the present invention is to provide a method of preparing a glass batch for silicate glass melting with the use of an a flux which provides an effective glass melting process without being toxic, aggressive to glass furnace lining and not leading to a rise in glassware production cost.

It is an object of the present invention to provide a method of preparing a glass batch for silicate glass melting with the use of an a flux which provides an effective glass melting process without being toxic, aggressive to the glass furnace lining and not involving a rise of glassware production cost.

This and other objects are accomplished, according to the invention, in preparing a glass batch for silicate glass melting by grinding the batch ingredients consisting of rocks and mixing them with intensifiers as additions, by the use of a high-modulus calcium nagnesium hydrosilicate, $x.CaO.y.MgO.n.SiO_2.m.H_2O$, as the flux.

To product this flux it is advantageous to mix, in an aqueous medium, diatomite with magnesium and calcium hydroxides, heat the resulting mixture to 50°–200°C, maintain it at this temperature for at least 20 minutes, then filter the mixture and dry the residue consisting of a high-modulus calcium-magnesium hydrosilicate.

The flux may be added to the batch in the form of its starting materials, viz. diatomite, calcined dolomite, calcium and magnesium hydroxides, taken in quantities corresponding to the desired glass composition.

This method will be further referred to as the dry method of preparing a glass batch in distinction to the hydrothermal method described hereinbelow.

In preparing a glass batch mixture of ingredients of said bath with a flux the mixture can be subjected to a hydrothermal treatment at a temperature of 50°–200°C for 20 minutes, whereupon said mixture is dried and granulated.

The nature of the present invention is as follows.

Giving due consideration to the fact that the accelerated fusion degree of the batch essentially depends on the nature of silicon dioxide, i.e. depends on the rate of chemical reactions and on the rate of dissolving silicon dioxide in a silicate solution, we have employed a new complex chemical substance ($x.CaO.y.MgO.n.SiO_2.m.H_2O$) — high-modulus calcium-magnesium hydrosilicate as the flux for melting silicate glasses.

This flux when present in the glass composition intensifies both the process of glass melting and clarifying and is instrumental in lowering the temperature and duration of glass melting.

The characteristic feature of the high-modulus calcium-magnesium hydrosilicate is the high reactability thereof caused by said hydrosilicate being amorphous, homogeneous, hydrated and possessing a constant chemical composition. The novel flux forms with the new batch-forming ingredients easily fusible eutectics which facilitate the interaction of the batch ingredients in the process of batch-forming (when they are employed in the dry method). In the hydrothermal method of glass batch preparation, a batch is obtained in the form of a complex silicate compound for colored glass, wherein silicate formation has occurred, partially, prior to the melting of said compound.

The present flux is not toxic and, since it does not react with the refractory lining of the furnace, may be used in any amount required by the preset glass composition.

The process of preparing a high-modulus calcium-magnesium hydrosilicate is controllable, which makes it possible to produce a flux of any composition by varying the content of calcium and magnesium oxides and silicon dioxide in it as may be required by the preset glass composition.

In this sense the present flux is universal, as it may be employed for all silicate glasses.

The silica modulus ($SiO_2:CaO.MgO$) in the product varies from 0.5 to 8.

It has been found, that the use of high-modulus calcium-magnesium hydrosilicate results in the reduction of glass melt viscosity (when the hydrothermal method of batch preparation is employed), lowering the melting temperature of thereof, on the average, by 200°C, an almost 10-fold reduction of melting time, and when the dry process of batch preparation is used, the temperature of melting of the glass mass is lowered by 100°C and the time by a factor of ten.

It has also been found that the flux hydrate water ($x.CaO.y.MgO.n.SiO_2.m.H_2O$) accelerates the glass melt clarifying process. An essential feature of the novel flux is that it makes it possible to perform accelerated melting of high-silica ($SiO_2$— over 51 %) and low alkali ($R_2O$ — up to 2 %) glass compositions whereas the melting of said glass compositions with conventional fluxes cannot be accomplished at all. This became possible due to the fact that when a high-modulus calcium-magnesium hydrosilicate is employed, a part of the silicon dioxide contained in the glass composition is replaced by amorphous silicon dioxide.

The use of the flux may be accomplished in two ways. In the first case the batch is prepared by the dry method, wherein the flux is one of the batch-forming ingredients and is mixed with ground rocks by the dry method.

In the second case the batch is prepared by the hydrothermal method wherein the ingredients which form the composition of the high-modulus calcium-magnesium hydrosilicate (diatomite, calcium and magnesium oxides) are subjected to a wet grinding with rocks and the resulting pulp is then dried and granulated in a fluidized bed furnace.

For a better understanding of the present invention, the following examples are given by way of illustration.

EXAMPLE 1.

Preparation of a batch of high-silica, low-alkali glass of the following composition (% by weight): $SiO_2=57.8$, $Fe_2O_3=7.7$, $CaO=19.2$, $MgO=4.6$, $R_2O=1.8$, $Al_2O_3=7.6$, $TiO_2=1.3$.

The chemical composition of the starting materials is presented in Table 1.

Table 1

| Starting materials | Composition of the ingredients (% by weight) | | | | | | |
|---|---|---|---|---|---|---|---|
| | $SiO_2$ | $Al_2O_3$ | $Fe_2O_3$ | $TiO_2$ | CaO | MgO | $R_2O$ |
| Basalt | 50.60 | 15.30 | 15.40 | 2.60 | 8.80 | 6.30 | 3.30 |
| Flux | 68.0 | 0.5 | 0.5 | — | 31.0 | 0.5 | — |

To prepare the batch, use was made of a flux prepared by the present method; its compositon is given in table 1. This method consists in hydrothermal treatment of a mixture of diatomite and calcium and magnesium hydroxides in a thermostat at a temperature of 50°C for 60 minutes. After the pulp thus obtained was filtered, the precipitated flux was dried and by the dry method mixed with basalt to prepare the glass batch. The thus prepared batch was then melted. The batch composition (% by weight):

Basalt — 54.80
Flux — 45.10

In preparing the flux the temperature of the hydrothermal treatment may be raised up to 200°C, thereby the time of the treatment is reduced to 5 minutes and a flux of a higher quality is obtained.

EXAMPLE 2.

Preparation of a batch of high-silica, low-alkali glass of the composition given in Example 1, by the hydrothermal method.

54.8 parts by weight of basalt of the composition given in Example 1, diatomite, and calcium and magnesium hydroxides (in quantities according to the composition of the flux given in table 1) were taken as the starting material. The starting ingredients of the batch were mixed in an aqueous medium and subjected to hydrothermal treatment at a temperature of 100°C for 30 minutes. The resulting pulp was dried and granulated in a fluidized bed furnace or in any other drying apparatus according to the conventional technique. After preparing the batches as described in Examples 1 and 2, a comparative melting of these two batches and of a batch of the same composition prepared by the dry method but with the use of a conventional flux for glass melting (CaF) was performed to determine the effectiveness of accelerating the glass melting process, when use is made of a new flux viz high-modulus calcium-magnesium hydrosilicate.

The results of the comparative meltings are given in Table 2.

Table 2

| Batch formulation | | Method of batch preparation | Temperature of melting to reach a homogeneous vitreous state, °C | Duration of melting, hours |
|---|---|---|---|---|
| quantity in parts by weight | Ingredients | | | |
| 54.8 | basalt | dry | 1350 | 1.0 |
| 45.1 | flux | | | |
| 54.8 | basalt | hydrothermal | 1250 | 1.0 |
| 45.1 | flux | | | |
| 54.8 | basalt | dry | 1450 | 6.0 |
| 30.8 | quartz sand | | | |
| 25.6 | limestone | | | |
| 1.0 | calcium fluoride | | | |

The data given in Table 2 show clearly that the batch prepared by the hydrothermal method and based on basalt and the novel flux is melted at a temperature 200°C lower, and the batch prepared by the dry method and based on basalt and the novel flux is melted at a temperature 100°C lower than the batch of the same composition but prepared on the basis of basalt, quartz sand and limestone with the use of the conventional flux viz. calcium fluoride. In both cases when the novel flux is used not only is the duration of glass melting reduced by 5 hours but the resulting glass melt possesses high homogeneity and has no impurities.

Similar to the aforementioned method, the batch may be prepared on the basis of other raw materials (pearlite, quartz sand, tuff etc.), the flux effect exerted on the glass melting process being approximately the same.

The flux employed by the present method is not corrosive to the refractory lining of glass furnaces and to that of platinum-rhodium vessels used for the production of glass fiber, which makes it possible to increase markedly their service life.

Besides, as the high-modulus calcium magnesium hydrosilicate is neither toxic nor volatile, conditions of work are improved, and thanks to the fact that said hydrosilicate remains in the glass without being volatilized, the yield of the final glass melt is increased which is conducive to reduction of the cost of the glass melting process.

The aforementioned feature is proved by the fixing of boric anhydride, contained in the glass composition, when the hydrothermal process of batch preparation is applied. As this takes place, silicate compounds of boron are formed which prevents the volatilization of the boric anhydride.

In addition we have found that glass fiber manufactured from the glass, produced from the above-described batch, is characterized by better physical and chemical properties and by stability of the filament drawing.

We claim:

1. A method of preparing a glass batch for melting silicate glass having an $SiO_2$ content over 51% and a low alkali metal oxide content of up to 2% which comprises grinding batch ingredients based on rocks and mixing said ingredients with a flux comprising high-modulus calcium-magnesium hydrosilicate $x.CaO.y.MgO.n.SiO_2 m.H_2O$ wherein the $SiO_2:CaO.MgO$ ratio is from 0.5 to 8 wherein the flux is produced by mixing silica, magnesia and calcia forming materials in an aqueous medium, heating the mixture to a temperaure of 50°–200°C, holding the mixture at said temperature for at least 20 minutes, filtering and drying the resulting residue consisting of a high modulus calcium-magnesium hydrosilicate.

2. A method as claimed in claim 1, wherein the flux is produced in the presence of ingredients based on rocks.

3. A method as claimed in claim 1, wherein the flux is added to the batch in the form of dolomite and calcined dolotomite taken in amounts corresponding to the desired glass composition.

* * * * *